(12) United States Patent
Masel et al.

(10) Patent No.: US 9,943,841 B2
(45) Date of Patent: Apr. 17, 2018

(54) METHOD OF MAKING AN ANION EXCHANGE MEMBRANE

(71) Applicant: Dioxide Materials, Inc., Boca Raton, FL (US)

(72) Inventors: Richard I. Masel, Boca Raton, FL (US); Syed Dawar Sajjad, Boca Raton, FL (US); Mark J. Pellerite, Woodbury, MN (US)

(73) Assignee: Dioxide Materials, Inc., Boca Raton, FL (US)

( * ) Notice: Subject to any disclaimer, the term of this patent is extended or adjusted under 35 U.S.C. 154(b) by 0 days.

(21) Appl. No.: 15/411,831

(22) Filed: Jan. 20, 2017

(65) Prior Publication Data

US 2017/0189898 A1   Jul. 6, 2017

Related U.S. Application Data

(63) Continuation-in-part of application No. 15/400,775, filed on Jan. 6, 2017, now Pat. No. 9,849,450, which is a continuation-in-part of application No. 15/090,477, filed on Apr. 4, 2016, now Pat. No. 9,580,824, which is a continuation-in-part of application No. 14/704,935, filed on May 5, 2014, now Pat. No. 9,370,773, which is a continuation-in-part of application No. PCT/US2015/014328, filed on Feb. 3, 2015.

(60) Provisional application No. 62/066,823, filed on Oct. 21, 2014.

(51) Int. Cl.
   - C02F 1/461 (2006.01)
   - B01J 41/14 (2006.01)
   - C25B 13/08 (2006.01)

(52) U.S. Cl.
   CPC .............. B01J 41/14 (2013.01); C25B 13/08 (2013.01)

(58) Field of Classification Search
   USPC .......................................... 429/479; 525/191
   See application file for complete search history.

(56) References Cited

U.S. PATENT DOCUMENTS

| | | | |
|---|---|---|---|
| 3,779,883 A | 12/1973 | Heit | |
| 3,896,015 A | 7/1975 | McRae | |
| 4,113,922 A | 9/1978 | D'Agostino et al. | |
| 4,430,445 A | 2/1984 | Miyake et al. | |
| 4,456,521 A | 6/1984 | Solomon et al. | |
| 5,883,762 A | 3/1999 | Calhoun et al. | |
| 7,704,369 B2 | 4/2010 | Olah et al. | |
| 8,138,380 B2 | 3/2012 | Olah et al. | |
| 8,313,634 B2 | 11/2012 | Bocarsly et al. | |
| 8,357,270 B2 | 1/2013 | Gilliam et al. | |
| 8,414,758 B2 | 4/2013 | Deguchi et al. | |
| 8,449,652 B2 | 5/2013 | Radosz et al. | |
| 8,500,987 B2 | 8/2013 | Teamey et al. | |
| 8,524,066 B2 | 9/2013 | Sivasankar et al. | |
| 8,552,130 B2 | 10/2013 | Lewandowski et al. | |
| 8,562,811 B2 | 10/2013 | Sivasankar et al. | |
| 8,568,581 B2 | 10/2013 | Sivasankar et al. | |
| 8,592,633 B2 | 11/2013 | Cole et al. | |
| 8,658,016 B2 | 2/2014 | Lakkaraju et al. | |
| 8,663,447 B2 | 3/2014 | Bocarsly et al. | |
| 8,696,883 B2 | 4/2014 | Yotsuhashi et al. | |
| 8,721,866 B2 | 5/2014 | Sivasankar et al. | |
| 9,255,335 B2 | 2/2016 | Kanan et al. | |
| 9,370,773 B2 * | 6/2016 | Masel | .................. B01J 41/14 |
| 9,580,824 B2 * | 2/2017 | Masel | .................. C02F 1/461 |
| 2009/0266230 A1 | 10/2009 | Radosz et al. | |
| 2011/0114502 A1 | 5/2011 | Cole et al. | |
| 2011/0237830 A1 | 9/2011 | Masel | |
| 2012/0171583 A1 | 7/2012 | Bocarsly et al. | |
| 2012/0186446 A1 | 7/2012 | Bara et al. | |
| 2012/0247969 A1 | 10/2012 | Bocarsly et al. | |
| 2013/0105304 A1 | 5/2013 | Kaczur et al. | |
| 2013/0146448 A1 | 6/2013 | Wang et al. | |
| 2013/0175181 A1 | 7/2013 | Kaczur | |
| 2013/0180865 A1 | 7/2013 | Cole et al. | |
| 2013/0199937 A1 | 8/2013 | Cole et al. | |
| 2015/0171453 A1 | 6/2015 | Chikashige et al. | |
| 2015/0345034 A1 | 12/2015 | Sundara et al. | |
| 2016/0107154 A1 | 12/2016 | Masel et al. | |

FOREIGN PATENT DOCUMENTS

| | | |
|---|---|---|
| JP | H02-166128 | 6/1990 |
| KR | 101360269 B1 | 2/2014 |
| WO | 2016/039999 A1 | 3/2016 |
| WO | 2016/064440 A1 | 4/2016 |
| WO | 2016/064447 A1 | 4/2016 |

OTHER PUBLICATIONS

Li et al., "Novel anion exchange membranes based on polymerizable imidazolium salt for alkaline fuel cell applications", J. Mater. Chem. 21 (2011), pp. 11340-11346.*

Lin et al., "Alkaline Stable C2-Substituted Imidazolium-Based Anion-Exchange Membranes", Chem. Mater. 25 (2013), pp. 1858-1867.*

Zhang et al., "Imidazolium functionalized polysulfone anion exchange membrane for fuel cell application", J. Mater. Chem. 21 (2011 ), pp. 12744-12752.*

Non-Final Office Action dated Mar. 22, 2017 in connection with U.S. Appl. No. 15/158,227.

International Preliminary Report on Patentability dated May 4, 2017 in connection with International Application No. PCT/US2015/014328.

International Preliminary Report on Patentability dated May 4, 2017 in connection with International Application No. PCT/US2015/026507.

Non-Final Office Action dated May 26, 2017 in connection with U.S. Appl. No. 15/400,775.

(Continued)

*Primary Examiner* — Mark Kaucher
*Assistant Examiner* — Henry Hu
(74) *Attorney, Agent, or Firm* — Corridor Law Group, P.C.

(57) ABSTRACT

A method to manufacture an ion exchange membrane involves treatment of the membrane in a strong base to strengthen the membrane, decrease the membrane solubility, and create linkages that can be detected by analysis using two-dimensional nuclear magnetic resonance (NMR).

20 Claims, No Drawings

(56) References Cited

OTHER PUBLICATIONS

Office Action issued by the Korean IP Office dated May 29, 2017 in connection with Korean Patent Application No. 10-2016-7022952.
Partial International Search Report dated Jun. 22, 2017 in connection with International Application PCT/US2017/025624.
Patent Examination Report dated Jun. 29, 2017 in connection with Australian Application No. 2015337093.
International Search Report and Written Opinion dated Jul. 12, 2017 in connection with International Application PCT/US2017/025628.
International Search Report and Written Opinion dated Jul. 28, 2017, in connection with related International Application No. PCT/US2014/025626.
International Search Report and Written Opinion dated Aug. 16, 2017 in connection with International Application PCT/US2017/025624.
Non-Final Office Action dated Aug. 22, 2017, in connection with U.S. Appl. No. 15/406,909.
Non-Final Office Action dated Sep. 1, 2017 in connection with U.S. Appl. No. 15/260,213.
Dewulf et al., "The electrochemical reduction of CO2 to CH4 and C2H4 at cu/nafion electrodes (solid polymer electrolyte structures)", Catalysis Letters 1 (1988), pp. 73-80.
Kaneco et al., "Electrochemical conversion of carbon dioxide to methane in aqueous NaHCO3 solution at less than 273 K" Electrochimica Acta 48 (2002), pp. 51-55.
Lee et al., "Humidity-sensitive properties of new polyelectrolytes based on the copolymers containing phosphonium salt and phosphine function", J. Applied Polymer Science, vol. 89, No. 4, Jul. 25, 2003, pp. 1062-1070.
Tang et al., "Poly(ionic liquid)s as New Materials for CO2 Absorption", Journal of Polymer Science Part A: Polymer Chemistry 43 (2005), pp. 5477-5489.
Siroma et al., "Compact dynamic hydrogen electrode unit as a reference electrode for PEMFCs", J. of Power Sources 156 (2006), pp. 284-287.
Chen et al., "A Concept of Supported Amino Acid Ionic Liquids and Their Application in Metal Scavenging and Heterogeneous Catalysis", J. Am. Chem. Soc. 129 (2007), pp. 13879-13886.
Delacourt et al., "Design of an Electrochemical Cell Making Syngas (CO + H2) from CO2 and H2O Reduction at Room Temperature", J. of the Electrochemical Society 155 (2008), pp. B42-B49.
Wang et al., "Water-Retention Effect of Composite Membranes with Different Types of Nanometer Silicon Dioxide" Electrochemical and Solid-State Letters vol. 11, No. 11, Jan. 1, 2008, p. B201-B204.
Luo et al., "Quaternized poly(methyl methacrylate-co-butyl acrylate-co-vinylbenzyl chloride) membrane for alkaline fuel cells", J. Power Sources. 195 (2010), pp. 3765-3771.
Tsutsumi et al., "A Test Method of a PEFC Single Cell with Reference Electrodes", Electrical Engineering in Japan, vol. 172, No. 1 (2010), pp. 1020-1026.
Narayanan et al., "Electrochemical Conversion of Carbon Dioxide to Formate in Alkaline Polymer Electrolyte Membrane Cells", J. of the Electrochemical Society, vol. 158, No. 2, Nov. 17, 2010, pp. A167-A173.
Rosen et al., "Ionic Liquid—Mediated Selective Conversion of CO2 to CO at Low Overpotentials", Science 334 (2011) pp. 643-644.
Weber et al., "Thermal and Ion Transport Properties of Hydrophilic and Hydrophobic Polymerized Styrenic Imidazolium Ionic Liquids", J. of Polymer Sci.: Part B: Polymer Phy. 49 (2011) pp. 1287-1296.
Sarode et al., "Designing Alkaline Exchange Membranes from Scratch", The Electrochemical Society, 220th ECS Meeting (2011).
Aeshala et al., "Effect of solid polymer electrolyte on electrochemical reduction of CO2", Separation and Purification Technology 94 (2012), pp. 131-137.
Deavin et al., "Anion-Exchange Membranes for Alkaline Polymer Electrolyte Fuel Cells: Comparison of Pendent Benzyltrimethylammonium- and Benzylmethylimidazolium-Head-Groups", Energy Environ. Sci. 5 (2012), pp. 8584-8597.

Oh, "Synthesis and Applications of Imidazolium-Based Ionic Liquids and Their Polymer Derivatives", Dissertation at the Missouri University of Science and Technology (2012).
Qiu et al., "Alkaline Imidazolium- and Quaternary Ammonium-Functionalized Anion Exchange Membranes for Alkaline Fuel Cell Applications", J. Mater. Chem. 22 (2012), pp. 1040-1045.
Rosen et al., "In Situ Spectroscopic Examination of a Low Overpotential Pathway for Carbon Dioxide Conversion to Carbon Monoxide", J. of Physical Chemistry 116 (2012), pp. 15307-15312.
Aeshala et al., "Effect of cationic and anionic solid polymer electrolyte on direct electrochemical reduction of gaseous CO2 to fuel", Journal of CO2 Utilization 3-4 (2013), pp. 49-55.
Carmo et al., "A comprehensive review on PEM water electrolysis", International J. of Hydrogen Energy 38 (2013), pp. 4901-4934.
Genovese et al., "A gas-phase electrochemical reactor for carbon dioxide reduction back to liquid fuels", AIDIC Conference Series 11 (2013), pp. 151-160.
Hickner et al., "Anion Exchange Membranes: Current Status and Moving Forward", J. of Polymer Sci. 51 (2013), pp. 1727-1735.
Prakash et al., "Electrochemical reduction of CO2 over Sn-Nafion coated electrode for a fuel-cell-like device", J. of Power Sources 223 (2013), pp. 68-73.
Rosen et al., "Low temperature electrocatalytic reduction of carbon dioxide utilizing room temperature ionic liquids", Dissertation at the University of Illinois (2013).
Rosen et al., "Water Enhancement of CO2 Conversion on Silver in 1-Ethyl-3-Methylimidazolium Tetrafluoroborate", J. of the Electrochemical Society 160 (2013), pp. H138-H141.
Shironita et al., "Feasibility investigation of methanol generation by CO2 reduction using Pt/C-based membrane electrode assembly for a reversible fuel cell", J. of Power Sources 228 (2013), pp. 68-74.
Shironita et al., "Methanol generation by CO2 reduction at a PtERu/C electrocatalyst using a membrane electrode assembly", J. of Power Sources 240 (2013), pp. 404-410.
Thorson et al., "Effect of Cations on the Electrochemical Conversion of CO2 to CO", J. of the Electrochemical Society 160 (2013), pp. F69-F74.
Wu et al., "Electrochemical Reduction of Carbon Dioxide", J. of the Electrochemical Society 160 (2013), pp. F953-F957.
Chen et al., "Composite Blend Polymer Membranes with Increased Proton Selectivity and Lifetime for Vanadium Redox Flow Batteries", J. of Power Sources, vol. 231, Jan. 9, 2013, pp. 301-306.
Yan et al. "Imidazolium-functionalized poly(ether ether ketone) as membrane and electrode ionomer for low-temperature alkaline membrane direct methanol fuel cell", Journal of Power Sources, vol. 250, Nov. 8, 2013, pp. 90-97.
Aeshala et al., "Electrochemical conversion of CO2 to fuels: tuning of the reaction zone using suitable functional groups in a solid polymer electrolyte", Phys. Chem. Chem. Phys. 16 (2014), pp. 17588-17594.
Carlisle et al., "Vinyl-Functionalized Poly(imidazolium)s: A Curable Polymer Platform for Cross-Linked Ionic Liquid Gel Synthesis", Chem. Mater. 26 (2014), pp. 1294-1296.
Ma et al., "Efficient Electrochemical Flow System with Improved Anode for the Conversion of CO2 to CO", J. of the Electrochemical Society 161 (2014), pp. F1124-F1131.
Parrondo et al., "Degradation of Anion Exchange Membranes Used for Hydrogen Production by Ultrapure Water Electrolysis", Royal Soc. of Chem. Adv. 4 (2014), pp. 9875-9879.
Said et al., "Functionalized Polysulfones as an Alternative Material to Improve Proton Conductivity at Low Relative Humidity Fuel Cell Applications", Chemistry and Materials Research 6 (2014), pp. 19-29.
Shi et al., "A novel electrolysis cell for CO2 reduction to CO in ionic liquid/organic solvent electrolyte", Journal of Power Sources 259 (2014) pp. 50-53.
Varcoe et al., "Anion-exchange membranes in electrochemical energy systems", Energy Environ. Sci. 7 (2014), pp. 3135-3191.
Kim et al., "Influence of dilute feed and pH on electrochemical reduction of CO2 to CO on Ag in a continuous flow electrolyzer", Electrochimica Acta 166 (2015), pp. 271-276.

(56) References Cited

OTHER PUBLICATIONS

Schauer et al., "Polysulfone-based anion exchange polymers for catalyst binders in alkaline electrolyzers", Journal of Applied Polymer Science (2015), pp. 1-7.
International Search Report and Written Opinion dated Jul. 6, 2015 in connection with International Application PCT/US2015/014328.
International Search Report and Written Opinion dated Jul. 20, 2015 in connection with International Application PCT/US2015/026507.
Restriction Requirement dated Jul. 30, 2015, in connection with related U.S. Appl. No. 14/704,935 (Having an PTO-892).
Non-Final Office Action issued by the USPTO dated Oct. 26, 2015, in connection with related U.S. Appl. No. 14/704,935.
Non-Final Office Action issued by the USPTO dated Dec. 1, 2015, in connection with related U.S. Appl. No. 14/704,934.
Final Office Action issued by the USPTO dated Apr. 27, 2016, in connection with related U.S. Appl. No. 14/704,934.
Office Action issued by the Korean IP Office dated Sep. 13, 2016 in connection with Korean Patent Application No. 10-2016-7022952.
Partial International Search Report dated Nov. 24, 2016 in connection with International Application PCT/US2016/045210.
International Search Report and Written Opinion dated Jan. 20, 2017 in connection with International Application No. PCT/US2016/045210.

* cited by examiner

METHOD OF MAKING AN ANION EXCHANGE MEMBRANE

CROSS-REFERENCE TO RELATED APPLICATIONS

The present application is a continuation-in-part of U.S. patent application Ser. No. 15/400,775 filed on Jan. 6, 2017, entitled "Ion-Conducting Membranes". The '775 application is, in turn, a continuation-in-part of U.S. patent application Ser. No. 15/090,477 filed on Apr. 4, 2016, now U.S. Pat. No. 9,580,824 issued on Feb. 28, 2017, also entitled "Ion-Conducting Membranes". The '477 application is, in turn, a continuation-in-part of U.S. patent application Ser. No. 14/704,935 filed on May 5, 2015 (now U.S. Pat. No. 9,370,773 issued on Jun. 6, 2016), also entitled "Ion-Conducting Membranes". The '935 application was, in turn, a continuation-in-part of International Application No. PCT/US2015/014328, filed on Feb. 3, 2015, entitled "Electrolyzer and Membranes". The '328 international application claimed priority benefits from U.S. provisional patent application Ser. No. 62/066,823, filed on Oct. 21, 2014.

The '935 application was also a continuation-in-part of International Application No. PCT/US2015/026507, filed on Apr. 17, 2015, entitled "Electrolyzer and Membranes". The '507 international application also claimed priority benefits from U.S. provisional patent application Ser. No. 62/066,823 filed Oct. 21, 2014.

The '775 parent application, the '477 application, the '935 application, the '823 provisional application, and the '328 and '507 international applications are each hereby incorporated by reference herein in their entirety.

This application is also related to U.S. patent application Ser. No. 13/445,887, filed Apr. 12, 2012, entitled "Electrocatalysts for Carbon Dioxide Conversion".

STATEMENT OF GOVERNMENT INTEREST

This invention was made, at least in part, with U.S. government support under ARPA-E Contract No. DE-AR-0000345. The government has certain rights in the invention.

FIELD OF THE INVENTION

The field of the invention is polymers. The method described in this patent is useful in crosslinking ion conducting polymers containing styrene and vinylbenzyl chloride.

BACKGROUND OF THE INVENTION

U.S. Pat. Nos. 9,370,773 and 9,481,939, as well as U.S. Patent Application Publication No US2016/0251766A1, describe a series of anion exchange membranes that were synthesized by functionalizing a styrene-vinyl benzyl chloride (VBC) polymer with a positively charged cyclic amine. The membranes showed record performance in a $CO_2$ electrolyzer, but the membranes were soft and easily broken so they needed to be reinforced with another polymer or cross-linking agent to obtain enough mechanical strength to be used in practice.

SUMMARY OF THE INVENTION

A method to crosslink an anion exchange membrane and/or improve its mechanical strength without having to add additional components. Generally, the method will comprise the steps of:

(a) providing a membrane comprising a polymer of styrene, vinylbenzyl-$R_s$ and vinylbenzyl-$R_x$, wherein $R_s$ is a positively charged cyclic amine group, $R_s$ being associated with a negatively charged counterion, and wherein $R_x$ is at least one substituent selected from the group consisting of Cl, OH, and O—$R_z$, wherein $R_z$ is selected from linear alkyls, branched alkyls, cyclic alkyls, heteroalkyls, aryls, heteroaryls, alkylaryls, and heteroalkylaryls, and wherein the total weight of the vinylbenzyl-$R_x$ groups is greater than 0.3% of the total weight of the polymer electrolyte membrane; and (b) soaking the polymer electrolyte membrane in a hydroxide-containing solution having a pH of at least 12 for at least 5 minutes.

In a preferred embodiment, the polymer electrolyte membrane is soaked in a hydroxide-containing solution having a pH of at least 13 for at least 5 minutes. In a more preferred embodiment the polymer electrolyte membrane is soaked in a hydroxide-containing solution having a pH of at least 14 for at least 5 minutes.

In a preferred embodiment, the total weight of the vinylbenzyl-$R_s$ groups is between 15% and 90% of the total weight of membrane.

In a preferred embodiment, $R_s$ is selected from the group consisting of imidazoliums, pyridiniums, pyrazoliums, pyrrolidiniums, pyrroliums, pyrimidiums, piperidiniums, indoliums, triaziniums, preferably imidazoliums and pyridiniums.

In a preferred embodiment of the polymeric composition, $R_s$ is an imidazolium. The imidazolium is preferably an alkylimidazolium, more preferably tetramethylimidazolium.

In a preferred embodiment of the polymeric composition, $R_s$ is a pyridinium. The pyridinium is preferably an alkylpyridinium In a preferred embodiment, the polymer will have a molecular weight between 1,000 and 10,000,000 atomic units (A.U.) preferably between 10,000 and 1,000,000 A.U., most preferably between 25,000 and 250,000 A.U.

In a preferred embodiment, the polymeric composition is in the form of a membrane. The membrane has a preferred thickness of from 10 to 300 micrometers.

Preferably the 2D H/C-13 HSQC nuclear magnetic resonance spectrum of the membrane polymer shows a correlation between peaks at δ3.3-5.4 in the proton spectrum and δ69-76 in the carbon-13 spectrum.

Preferably the 2D H/C-13 HSQC nuclear magnetic resonance spectrum of the membrane polymer shows a correlation between peaks at δ4.4±1 in the proton spectrum and δ71±2 in the carbon-13 spectrum.

Preferably the 2D H/C-13 HSQC nuclear magnetic resonance spectrum of the membrane polymer shows a correlation between peaks at δ4.4±1 in the proton spectrum and δ62±2 in the carbon-13 spectrum.

DETAILED DESCRIPTION OF ILLUSTRATIVE EMBODIMENT(S)

It is understood that the process is not limited to the particular methodology, protocols and reagents described herein, as these can vary as persons familiar with the technology involved here will recognize. It is also to be understood that the terminology used herein is used for the purpose of describing particular embodiments only, and is not intended to limit the scope of the process. It also is to be noted that as used herein and in the appended claims, the singular forms "a," "an," and "the" include the plural reference unless the context clearly dictates otherwise. Thus, for example, a reference to "a linker" is a reference to one or more linkers and equivalents thereof known to those skilled in the art. Similarly, the phrase "and/or" is used to indicate one or both stated cases can occur, for example, A and/or B includes (A and B) and (A or B).

Unless defined otherwise, technical and scientific terms used herein have the same meanings as commonly understood by one of ordinary skill in the art to which the process pertains. The embodiments of the process and the various features and advantageous details thereof are explained more fully with reference to the non-limiting embodiments and/or illustrated in the accompanying drawings and detailed in the following description. It should be noted that the features illustrated in the drawings are not necessarily drawn to scale, and features of one embodiment can be employed with other embodiments as the skilled artisan would recognize, even if not explicitly stated herein.

Any numerical value ranges recited herein include all values from the lower value to the upper value in increments of one unit, provided that there is a separation of at least two units between any lower value and any higher value. As an example, if it is stated that the concentration of a component or value of a process variable such as, for example, size, angle size, pressure, time and the like, is, for example, from 1 to 98, specifically from 20 to 80, more specifically from 30 to 70, it is intended that values such as 15 to 85, 22 to 68, 43 to 51, 30 to 32, and the like, are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value are to be treated in a similar manner.

Moreover, provided immediately below is a "Definitions" section, where certain terms related to the process are defined specifically. Particular methods, devices, and materials are described, although any methods and materials similar or equivalent to those described herein can be used in the practice or testing of the process.

Definitions

The term "polymer electrolyte membrane" refers to both cation exchange membranes, which generally comprise polymers having multiple covalently attached negatively charged groups, and anion exchange membranes, which generally comprise polymers having multiple covalently attached positively charged groups. Typical cation exchange membranes include proton conducting membranes, such as the perfluorosulfonic acid polymer available under the trade designation NAFION from E.I. du Pont de Nemours and Company (DuPont) of Wilmington, Del.

The term "anion exchange membrane electrolyzer" as used here refers to an electrolyzer with an anion-conducting polymer electrolyte membrane separating the anode from the cathode.

The term "polymeric film liner" as used here refers to a single or multilayer polymer film that is no more than 2 millimeters thick.

The term "Hydrogen Evolution Reaction," also called "HER," as used here refers to the electrochemical reaction $2H^+ + 2e^- \rightarrow H_2$.

The term "MEA" as used here refers to a membrane electrode assembly.

The term "Millipore water" is water that is produced by a Millipore filtration system with a resistivity of at least 18.2 megaohm-cm.

The term "imidazolium" as used here refers to a positively charged ligand containing an imidazole group. This includes a bare imidazole or a substituted imidazole. Ligands of the form:

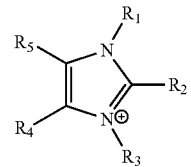

$R_1$-$R_5$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinylbenzyl copolymers described herein, are specifically included.

The term "pyridinium" as used here refers to a positively charged ligand containing a pyridine group. This includes a bare pyridine or a substituted pyridine. Ligands of the form:

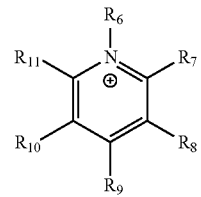

$R_6$-$R_{11}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinyl benzyl copolymers described herein, are specifically included.

The term "phosphonium" as used here refers to a positively charged ligand containing phosphorus. This includes substituted phosphorus. Ligands of the form:

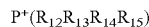

$P^+(R_{12}R_{13}R_{14}R_{15})$ $R_{12}$-$R_{15}$ are each independently selected from hydrogen, halides, linear alkyls, branched alkyls, cyclic alkyls, heteroalkyls, aryls, heteroaryls, alkylaryls, heteroalkylaryls, and polymers thereof, such as the vinylbenzyl copolymers described herein, are specifically included.

The term "positively charged cyclic amine" as used here refers to a positively charged ligand containing a cyclic amine. This specifically includes imidazoliums, pyridiniums, pyrazoliums, pyrrolidiniums, pyrroliums, pyrimidiums, piperidiniums, indoliums, triaziniums, and polymers thereof, such as the vinyl benzyl copolymers described herein.

The term "simple amine" as used here refers to a species of the form:

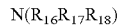

$N(R_{16}R_{17}R_{18})$ $R_{16}$-$R_{18}$ are each independently selected from hydrogen, linear alkyls, branched alkyls, cyclic alkyls, heteroalkyls, aryls, heteroaryls, alkylaryls, and heteroalkylaryls, but not polymers.

The term "HSQC" as used here refers to heteronuclear single quantum correlation nuclear magnetic resonance (NMR) spectroscopy.

SPECIFIC DESCRIPTION

Specific Example 1

The objective of this example was to demonstrate a method to crosslink an anion exchange membrane.

Step 1. Preparing a polymer membrane comprising a polymer comprising styrene, vinylbenzyl-$R_s$ and vinylbenzyl-$R_x$, wherein $R_s$ is a positively charged cyclic amine group, $R_s$ being associated with a negatively charged counterion, and wherein $R_x$ is at least one substituent selected from the group consisting of Cl, OH, and O—$R_{19}$, wherein $R_{19}$ is selected from linear alkyls, branched alkyls, cyclic alkyls, heteroalkyls, aryls, heteroaryls, alkylaryls, and heteroalkylaryls and wherein the total weight of the vinylbenzyl-$R_x$ groups is greater than 0.3% of the total weight of the polymer electrolyte membrane, as in the following example:

(a) First, inhibitor-free vinylbenzyl chloride (VBC) was prepared by adding a volume V of 4-vinylbenzyl chloride, (Sigma-Aldrich, Saint Louis, Mo.) and a volume equal to V/4 of 4% aqueous sodium hydroxide into a separatory funnel, followed by agitating the funnel to mix the water and VBC, then decanting the VBC. The process was repeated five times until the water layer didn't show obvious color change. The procedure was repeated using pure water instead of sodium hydroxide solution until the water layer pH was neutral. Washed VBC was put into a freezer overnight before weighing, to make sure any residual water was mainly in ice form, and the ice was then separated from the VBC by filtration or decantation.

(b) Next, inhibitor-free styrene was prepared by feeding styrene (Sigma-Aldrich) through a 60 mL syringe (HSW, Tuttlingen, Del.) packed with Sigma-Aldrich 311340 Inhibitor remover.

(c) Poly(4-vinylbenzyl chloride-co-styrene) was then synthesized by heating a solution of inhibitor-free styrene (Sigma-Aldrich) (172.3 g, 1.65 mol) and the 4-vinylbenzyl chloride prepared above (Sigma-Aldrich) (143.1 g, 0.94 mol) in chlorobenzene (Sigma-Aldrich) (250 g) at 60-65° C. in an oil bath for 22 hours under nitrogen gas with AIBN (α,α'-Azoisobutyronitrile, Sigma-Aldrich) (2.9635 g, 0.94 wt % based on the total monomers weight) as initiator. The copolymer was precipitated in methanol, then washed thoroughly with millipore water and dried at 60° C. overnight.

(d) Next, 1,2,4,5-tetramethylimidazole (TCI, Japan) (3.700 g, 0.0298 mol), above-synthesized poly(4-VBC-co-St) (10 g), anhydrous ethanol (17 g, Sigma-Aldrich), anhydrous toluene (12.5 g, Sigma-Aldrich), were mixed under the protection of nitrogen flow. The mixture was stirred and heated to 78° C. for about 1 hour. When the solution turned clear, the reaction temperature was decreased to 55° C. and maintained for 71 hours resulting in an imidazolium-substituted cationic polymer having negative chloride counterions. The chloride ions were a product of the imidazolium-forming quaternization reaction between the 1,2,4,5-tetramethylimidazole and the benzyl chloride groups.

(e) Membranes were then generated by casting the polymer solutions prepared above directly onto a polyethylene terephthalate (PET) polymeric film liner. The thickness of the solution on the liner was controlled by a film applicator (MTI Corporation, Richmond, Calif.) with an adjustable doctor blade. The polymer membranes were then dried in a vacuum oven with temperature increased to 70° C. and held for 1 hour. After one more hour in the vacuum oven with temperature slowly decreased, the polymer membranes were taken out of the oven.

Step 2: Crosslinking. The polymer membranes above were soaked in a 1 M KOH solution overnight at room temperature, during which time the membranes fell from the liners. The KOH solution was changed twice, each with at least two hours of immersion, to make sure that the membrane chloride ions were completely exchanged for hydroxide ions, so that the polymer membranes were converted into the hydroxide form.

NMR analysis before step 2 indicates that the about 20% of the VBC groups in the resultant polymer were not converted to vinylbenzyl imidazolium chloride at the end of this step. Calculations indicate the total weight of the vinylbenzyl-Cl groups is about 6% of the total weight of the polymer electrolyte membrane;

Before step 2, the polymers were soluble in many solvents, but after step 2 the polymer membranes were insoluble in dimethyl sulfoxide (DMSO), dimethylformamide (DMF), isopropanol, 1-propanol, chloroform, acetone, toluene and ethanol, suggesting that some residual vinylbenzyl chlorides and/or the hydroxides from the soaking solution had reacted with some other species to form cross-links.

In other measurements it was found that when the total weight of vinylbenzyl-$R_z$ groups is less that about 0.3%, the membranes are still soluble in DMF suggesting that the cross linking is limited.

The conductivity of the film using electrochemical impedance spectroscopy was also measured. The particular film created here had a conductivity of 73 mS/cm at 60° C. in 1 M KOH. Films manufactured by varying the functionalization time in step 1(d) had conductivities between 40 and 95 mS/cm at 60° C. in 1 M KOH.

The Young's modulus of the membrane was also measured after being soaked in 6% by weight ethylene glycol overnight and then 1 M KOH for 20 hours. The membrane showed a tensile strength of 33 MPa and an elongation at break of 58%. Other membranes with fewer vinylbenzyl-$R_z$ groups showed Young's modulus down to about 15 MPa.

The crosslinking above was done by soaking the membrane in 1 M KOH (pH=14) overnight at room temperature. In other experiments it was found that a membrane prepared as above was initially soluble in dimethyl sulfoxide (DMSO), dimethylformamide (DMF), isopropanol, and ethanol. When it was soaked in 1 M KOH for 30 minutes at room temperature it was still soluble in all of these solvents, but when the membrane was treated for 12 minutes in 1 M KOH at 50° C., it was insoluble. Other tests showed that the membrane started to lose solubility at about 5 minutes at 50° C. in 1 M KOH (pH 14). The membrane was still soluble in 30 minutes in 0.1 M KOH (pH 13) and 0.01 M KOH (pH 12), but was insoluble after 2 hours. Generalizing this result says that some crosslinking occurs when the polymer membrane is exposed to a hydroxyl-containing solution at a pH of at least 12 for at least 5 minutes.

Two-dimensional (2D) proton/C-13 NMR spectra were taken on samples where 1-methylimidazole was substituted for tetramethylimidazole in a procedure comparable to that described above. NMR spectra of this sample were acquired on a Bruker 500 MHz instrument equipped with HSQC (heteronuclear single quantum correlation) capability. This technique generates two-dimensional correlation plots that use the one-dimensional NMR spectra (in this case, carbon-13 and proton) as x- and y-axes, respectively. This method is useful for elucidating peak assignments and connectivity patterns in organic molecules. This is achieved by indicating bonding relationships between, for instance, a peak in the proton spectrum and a peak in the carbon-13 spectrum. The two-dimensional spectrum indicates a correlation between peaks giving rise to a carbon-13 signal and the proton spectrum signal from the hydrogens bonded to that carbon. In some instances, HSQC can aid in revealing when strongly overlapped signals in the proton spectrum actually arise from more than one type of chemical functionality even though such information is hidden when only the one-dimensional spectrum is analyzed.

The NMR spectra after the membrane was soaked in KOH showed correlated peaks at chemical shifts of δ4.3-4.4 in the proton NMR spectrum and δ71-74 in the carbon-13 NMR spectrum versus a tetramethylsilane reference, consistent with the formation of benzyl ether substituents $R_x$ in the polymer, and consistent with dibenzyl ether crosslinks. This suggests that the KOH treatment can create crosslinks in the polymer, presumably via a mechanism such as:

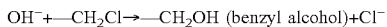

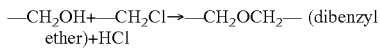

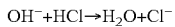

Further support for the above mechanism can be found in the observation of 2-D NMR signals arising from benzylic alcohol units ($R_x$=OH) at δ4.4 in the proton NMR spectrum and δ62 in the carbon-13 NMR spectrum. These are formed from reaction of the vinylbenzyl chloride units (seen by 2-D NMR at δ4.7 in the proton NMR spectrum and δ46 in the carbon-13 NMR spectrum) with water or hydroxide.

Correlated peaks at δ4.4 were also observed in the proton NMR spectrum and δ71 in the C-13 NMR, and δ3.4 (proton) and δ65 (carbon-13) that are suggestive of vinylbenzyl-$OCH_2CH_3$ ($R_{19}$=ethyl) units in the case where ethanol was used as the solvent instead of chlorobenzene in step 1(c). Also observable in some samples exposed to methanol solvent are correlated peaks at δ3.2 (proton) and δ57 (carbon-13) assigned to the presence of benzyl methyl ether units, -vinylbenzyl-$OCH_3$ ($R_{19}$=methyl) in the ionomer.

Note, however that proton NMR peaks can shift as much as ±1 ppm according to polymer chemical structural environment, which solvent is used and how much the membrane swells in the solvent, while carbon-13 NMR spectra can shift by was much as ±2 ppm. Thus, there is the uncertainty of ±1 ppm in the proton NMR peak positions and ±2 ppm in the carbon-13 NMR spectra.

While particular elements, embodiments and applications of the present invention have been shown and described, it will be understood that the invention is not limited thereto since modifications can be made by those skilled in the art without departing from the scope of the present disclosure, particularly in light of the foregoing teachings.

The examples given above are merely illustrative and are not meant to be an exhaustive list of all possible embodiments, applications or modifications of the present electrochemical device. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention which are obvious to those skilled in the chemical arts or in the relevant fields are intended to be within the scope of the appended claims.

What is claimed is:

1. A process for making a crosslinked anion exchange membrane, comprising the steps of:
   (a) providing a polymer membrane comprising a terpolymer of styrene, vinylbenzyl-$R_s$ and vinylbenzyl-$R_x$, wherein $R_s$ is a positively charged cyclic amine group, wherein $R_x$ is at least one constituent selected from the group consisting of Cl, OH, and O—$R_z$, wherein $R_z$ is selected from linear alkyls, branched alkyls, cyclic alkyls, heteroalkyls, aryls, heteroaryls, alkylaryls, and heteroalkylaryls, and wherein the total weight of the vinylbenzyl-$R_x$ groups is greater than 1% of the total weight of the polymer; and
   (b) soaking the polymer membrane in a hydroxide-containing solution having a pH of at least 12 for at least 5 minutes.

2. The process of claim 1, wherein step (b) comprises soaking the polymer membrane in a hydroxide-containing solution having a pH of at least 13 for at least 5 minutes.

3. The process of claim 2, wherein step (b) comprises soaking the polymer membrane in a hydroxide-containing solution having a pH of at least 14 for at least 5 minutes.

4. The process of claim 1, comprising the step of forming the polymer membrane by casting a polymer solution made from a solvent onto a polymeric film liner.

5. The process of claim 1, wherein the total weight of the vinylbenzyl-$R_s$ groups in said polymer membrane is between 15% and 90% of the total weight of the polymer membrane.

6. The process of claim 1, wherein said crosslinked ion exchange membrane has a thickness of from 10 to 300 micrometers.

7. The process of claim 1, wherein the total weight of the vinylbenzyl-$R_x$ groups in said polymer membrane is between 0.3% and 25% of the total weight of the polymer membrane.

8. The process of claim 7, wherein the total weight of the vinylbenzyl-$R_x$ groups in said polymer membrane is between 1% and 15% of the total weight of the membrane.

9. The process of claim 1, wherein said positively charged cyclic amine group is an imidazolium or a pyridinium.

10. The process of claim 9, wherein said positively charged cyclic amine group is an alkylpyridinium.

11. The process of claim 9, wherein said positively charged cyclic amine group is tetramethylimidazolium.

12. The process of claim 1, wherein said crosslinked anion exchange membrane is characterized by the presence of benzyl ether groups, as measured by 2D nuclear magnetic resonance spectroscopy.

13. The process of claim 12, wherein the 2D proton/carbon-13 nuclear magnetic resonance spectroscopy measurements are performed on solid samples of said crosslinked anion exchange membrane that have been swollen by soaking the samples in dimethyl sulfoxide.

14. The process of claim 1 wherein a 2D H/C-13 HSQC nuclear magnetic resonance spectrum of crosslinked anion exchange membrane shows a correlation between peaks having a chemical shift of from δ3.3 to δ5.4 in the proton spectrum and from δ69 to δ76 in the carbon-13 spectrum.

15. The process of claim 14 wherein the 2D H/C-13 HSQC nuclear magnetic resonance spectrum of the crosslinked anion exchange membrane shows a correlation between peaks at δ4.4±1 in the proton spectrum and δ71±2 in the carbon-13 spectrum.

16. The process of claim 1 wherein a 2D H/C-13 HSQC nuclear magnetic resonance spectrum of the crosslinked anion exchange membrane shows a correlation between peaks at chemical shifts of $\delta 4.4 \pm 1$ in the proton spectrum and $\delta 62 \pm 2$ in the carbon-13 spectrum.

17. The process of claim 1 wherein a 2D H/C-13 HSQC nuclear magnetic resonance spectrum of the crosslinked anion exchange membrane shows a correlation between peaks at chemical shifts of $\delta 3.2 \pm 1$ in the proton spectrum and $\delta 57 \pm 2$ in the carbon-13 spectrum.

18. The process of claim 1, wherein said crosslinked anion exchange membrane is insoluble in any solvent or solvent mixture selected from the group consisting of ethanol, dimethyl sulfoxide, and dimethyl formamide.

19. The process of claim 1, wherein said crosslinked anion exchange membrane has a hydroxide ion conductivity of at least 40 mS/cm at 60° C. in 1 M KOH.

20. The process of claim 1, wherein said crosslinked anion exchange membrane has a Young's Modulus of at least 15 MPa.

* * * * *

UNITED STATES PATENT AND TRADEMARK OFFICE
CERTIFICATE OF CORRECTION

PATENT NO. : 9,943,841 B2
APPLICATION NO. : 15/411831
DATED : April 17, 2018
INVENTOR(S) : Richard I. Masel, Syed Dawar Sajjad and Mark J. Pellerite It is certified that error appears in the above-identified patent and that said Letters Patent is hereby corrected as shown below:

On the Title Page

(73) Assignee, should read as:
(73) Assignee: Dioxide Materials, Inc, Boca Raton, FL (US)
3M Innovative Properties Company, St. Paul, MN (US)

Signed and Sealed this
Second Day of April, 2019

Andrei Iancu
*Director of the United States Patent and Trademark Office*